Aug. 11, 1936.   J. REID   2,050,630
COMBINED COUPLING AND SAFETY DEVICE FOR POWER TRANSMISSION SHAFTS
Filed June 12, 1935
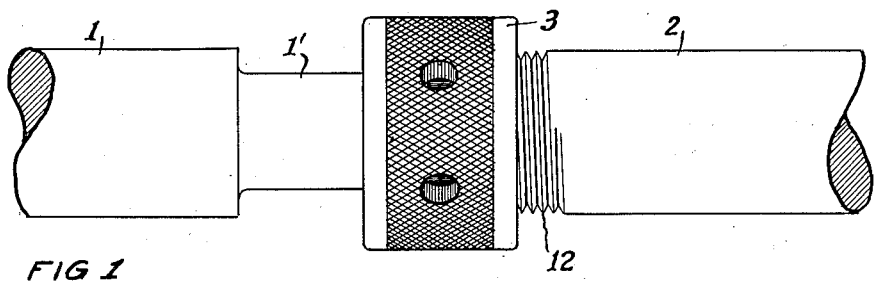
FIG 1
FIG. 4.
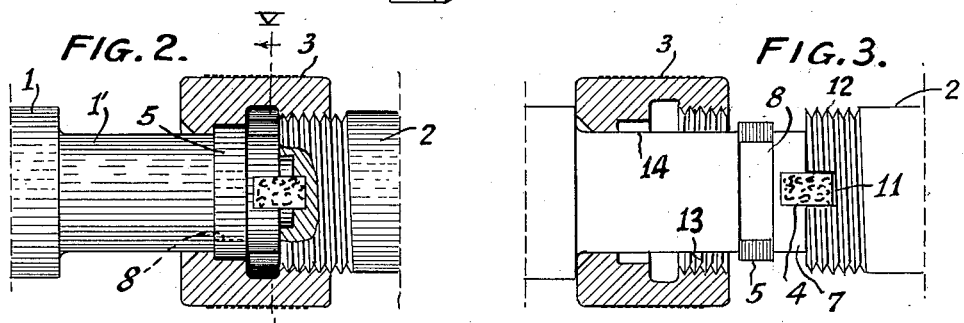
FIG. 2.   FIG. 3.
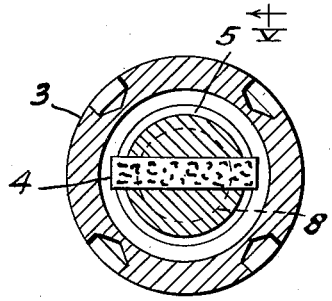
FIG. 5
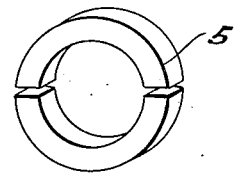
FIG. 6.
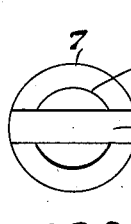   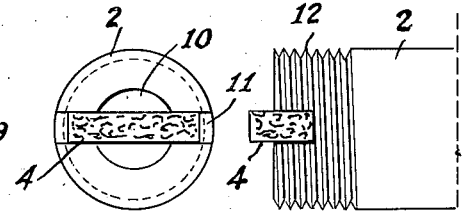
FIG. 7.   FIG. 8.   FIG. 9.   FIG. 10
INVENTOR
JOHN REID
BY
Edward R. Inman
ATTORNEY Patented Aug. 11, 1936

2,050,630

UNITED STATES PATENT OFFICE 2,050,630

COMBINED COUPLING AND SAFETY DEVICE FOR POWER TRANSMISSION SHAFTS

John Reid, Oil City, Pa.

Application June 12, 1935, Serial No. 26,149

2 Claims. (Cl. 64—28)

This invention relates to a safety coupling for rotary power-transmission shafting.

A specific example of one use to which it is especially applicable is an incorporation in the driving shaft of the impeller of a centrifugal pump.

This type of pump is extensively employed to cause the circulation of cooling water through the water-jacket of internal combustion engines, especially those of the Diesel type, when used in the operation of oil well machinery; in this class of service, the shaft of the pump is usually driven from a lay shaft of the engine. In many localities the natural water supply is heavily impregnated with impurities of various kinds, such as lime, magnesia, etc., in which corrosive substances are often present. When the power plant and the pump are idle, this material will precipitate and settle into a compact mass about the impeller of the pump, so that care must be taken that the pump or related machinery is not injured in re-starting the engine.

It will be readily understood by those skilled in the art to which this invention relates, that other conditions of danger may arise in the class of service specifically noted, as well as in other classes of services to which this invention is equally well adapted, which will cause said safety device to perform its specific, objective function.

It is the object of this invention to supply a safety device in the form of a frangible key, or like element, and the novel interposition of same in the rotary driving shaft of such a pump, and for other similar service, the frangibility of which key is sufficiently below the torsional limit of the shaft, to give way, and thus forestall injury to the instant shaft or the elements operated thereby.

The construction of my improved safety coupling is clearly illustrated in the accompanying drawing in which:

Fig. 1 is a side elevation of a shaft with my improved coupling applied thereto.

Fig. 2 is a side elevation, partly in vertical section, of a shaft equipped with my improved coupling; a portion of one end of one of the coupled shafts being broken away in this view to expose a portion of the other shaft to view.

Fig. 3 is a side elevation of a shaft having my improved coupling applied thereto; the coupling sleeve in this view is shown in vertical section and the position in which it is placed for coupling and uncoupling the shaft.

Fig. 4 is a perspective view of the frangible key, which is here indicated as being composed of vulcanized fiber.

Fig. 5 is a transverse section on line V—V of Fig. 2.

Fig. 6 is a perspective view of an element termed the retainer ring.

Fig. 7 is an elevation of the left-hand shaft member 1 of Fig. 1, which is hereinafter termed the "first member".

Fig. 8 is an elevation of the adjacent end of Fig. 7.

Fig. 9 is an end view of the adjacent end of Fig. 10, and

Fig. 10 is a side elevation of the right hand shaft member of Fig. 1, which is herein termed the "second member", the frangible key being shown in its service position.

Referring to Fig. 1, two shaft ends, 1 and 2, together with the coupling sleeve, 3, are here shown.

In Fig. 2 the coupling sleeve is shown in vertical, central, longitudinal section, thus exposing the frangible key 4 to view, also the tension members 5, 5, a portion of the adjacent end of shaft being broken away to show the dowel and socket.

As shown in Fig. 7, the coupling end of the shaft 1 is shown as being formed at its extremity into a dowel 6, a head 7, a neck or ring-groove 8, also a key-way 9.

In Figs. 9 and 10, the end of shaft 2 is shown as being provided with a socket 10 for the reception of dowel 6, a key-way 11 for the reception of key 4, and an external thread 12 for co-operation with the internal thread 13 of sleeve 3.

Referring to Fig. 3, this view is supplied for the purpose of showing the method of assembling the component parts of the joint in making up the coupling; in performing this operation, sleeve 3 is first placed upon the reduced portion 1' of the first member 1; the tension ring, consisting of the two portions 5, 5 are then assembled in the ring-groove 8; the frangible element 4 is then inserted within the key-way or groove 9; the second member 2 is then placed in the coupling position wherein dowel 6 occupies socket 10, whereby axial alignment of said shafts is primarily secured, and key 4 occupies the seat or key-way 11. Sleeve 3 is now screwed upon the co-operating external thread 12, and at this juncture the inner face of the inwardly-extending annular projection 14 of collar 3 is in impinging relation to the revealed face 15 of ring 5, and this impingement causes the two members 1 and 2 to be drawn longitudinally closely together as said sleeve 3 is screwed firmly in position, and key 4 to be secured firmly therebetween; said dowel and socket construction serves primarily to retain said members 1 and 2 in true axial alignment while the coupling is being made up. It will thus be readily understood that the strain upon key 4 is a torsional strain only, and that if the driven member,—as in the given case of the shaft of an impeller of a centrifugal pump—presents more than the usual, or predetermined resistance to the drive, key 4 is sheared, thus preventing damage to any other portion of the related mechanical structure.

While the drawing indicates that the portion 1' of first shaft 1 is reduced, this is not necessarily, inventively so, as any other structure which will produce the indicated difference in the diameters between member 1 and member 2 will suffice.

I claim the following:

1. A combined coupling and safety device for axially-aligned, rotative, power-transmission shafting, comprising in combination with the two abutting ends of such shafting, a coupling-collar for said ends whereby they are lineally-rigidly, relatively-rotatively joined together, there being a key-seat conjointly formed and extending into the respective abutting end faces of said shafts, and a frangible key occupying said seats for the transmission of power from one of said shafts to the other; the frangibility of said key being in relatively reduced proportion to rotative power-transmitting strength of said shafting, said abutting ends having as features thereof, an annular projection and an external screw-thread respectively, adapted for engagement with and by said coupling collar, whereby said abutting relation of said ends is maintained.

2. In the organization defined in claim 1, the abutting ends of said shafting members being supplied with a dowel and a socket respectively, whereby said ends are primarily caused to be positioned in true axial alignment while the coupling is being made up.

JOHN REID.